(12) United States Patent
Thom et al.

(10) Patent No.: US 11,473,837 B2
(45) Date of Patent: Oct. 18, 2022

(54) GAS SUBCOOLED PROCESS CONVERSION TO RECYCLE SPLIT VAPOR FOR RECOVERY OF ETHANE AND PROPANE

(71) Applicant: UOP LLC, Des Plaines, IL (US)

(72) Inventors: David M. Thom, Tulsa, OK (US); Jeffrey R. Garrison, Jenks, OK (US); David Farr, Tulsa, OK (US)

(73) Assignee: UOP LLC, Des Plaines, IL (US)

( * ) Notice: Subject to any disclaimer, the term of this patent is extended or adjusted under 35 U.S.C. 154(b) by 683 days.

(21) Appl. No.: 16/506,634

(22) Filed: Jul. 9, 2019

(65) Prior Publication Data
US 2020/0072546 A1 Mar. 5, 2020

Related U.S. Application Data

(60) Provisional application No. 62/725,851, filed on Aug. 31, 2018.

(51) Int. Cl.
*F25J 3/02* (2006.01)
*B01D 53/00* (2006.01)

(52) U.S. Cl.
CPC .......... *F25J 3/0209* (2013.01); *B01D 53/002* (2013.01); *B01D 2257/708* (2013.01); *B01D 2257/7025* (2013.01); *F25J 2235/60* (2013.01)

(58) Field of Classification Search
CPC .... F25J 3/0209; F25J 2235/60; B01D 53/002; B01D 2257/708; B01D 2257/7025
See application file for complete search history.

(56) References Cited

U.S. PATENT DOCUMENTS

| | | |
|---|---|---|
| 4,140,504 A | 2/1979 | Campbell et al. |
| 4,278,457 A | 7/1981 | Campbell et al. |
| 4,617,039 A | 10/1986 | Buck |
| 4,854,955 A | 8/1989 | Campbell et al. |
| 4,869,740 A | 9/1989 | Campbell et al. |
| 4,889,545 A | 12/1989 | Campbell et al. |
| 5,114,451 A | 5/1992 | Rambo et al. |
| 5,275,005 A | 1/1994 | Campbell et al. |
| 5,555,748 A | 9/1996 | Campbell et al. |
| 5,771,712 A | 6/1998 | Campbell et al. |
| 5,799,507 A | 9/1998 | Wilkinson et al. |
| 5,881,569 A | 3/1999 | Campbell et al. |
| 5,890,378 A | 4/1999 | Rambo et al. |

(Continued)

FOREIGN PATENT DOCUMENTS

| | | | |
|---|---|---|---|
| WO | 199736139 | 2/1997 | |
| WO | WO-9736139 A1 * | 10/1997 | ............. F25J 1/0022 |

OTHER PUBLICATIONS

International Search Report and Written Opinion for corresponding International Application PCT/US 2019/048509 dated Nov. 21, 2019—references listed on this document cited above as US patents where possible.

*Primary Examiner* — Youngsul Jeong
(74) *Attorney, Agent, or Firm* — Paschall & Associates, LLC; Mark Goldberg

(57) ABSTRACT

A design is provided to convert a gas subcooled process plant to a recycle split vapor process for recovering ethane and propane from natural gas. When in operation, the recovery of ethane and propane can exceed 97 to 99 wt. % of the stream being processed. A second smaller demethanizer column is added to the gas subcooled process plant as well as the addition of several cryogenic pumps.

11 Claims, 1 Drawing Sheet

(56) References Cited

U.S. PATENT DOCUMENTS

| | | | |
|---|---|---|---|
| 5,983,664 | A | 11/1999 | Campbell et al. |
| 6,526,777 | B1 | 3/2003 | Campbell et al. |
| 6,742,358 | B2 | 6/2004 | Wilkinson et al. |
| 6,915,662 | B2 | 7/2005 | Wilkinson et al. |
| 6,945,075 | B2 | 9/2005 | Wilkinson et al. |
| 7,010,937 | B2 | 3/2006 | Wilkinson et al. |
| 7,155,931 | B2 | 1/2007 | Wilkinson et al. |
| 7,191,617 | B2 | 3/2007 | Cuellar et al. |
| 7,204,100 | B2 | 4/2007 | Wilkinson et al. |
| 7,210,311 | B2 | 5/2007 | Wilkinson et al. |
| 7,216,507 | B2 | 5/2007 | Cuellar et al. |
| 7,565,815 | B2 | 7/2009 | Wilkinson et al. |
| 7,631,516 | B2 | 12/2009 | Cuellar et al. |
| 8,590,340 | B2 * | 11/2013 | Pitman ............... F25J 3/0209 62/620 |
| 8,881,549 | B2 | 11/2014 | Johnke et al. |
| 8,919,148 | B2 * | 12/2014 | Wilkinson ............ F25J 3/0209 62/620 |
| 9,021,832 | B2 | 5/2015 | Pierce et al. |
| 9,057,558 | B2 | 6/2015 | Johnke et al. |
| 9,080,811 | B2 | 7/2015 | Johnke et al. |
| 9,933,207 | B2 | 4/2018 | Johnke et al. |
| 9,939,195 | B2 | 4/2018 | Johnke et al. |
| 10,465,132 | B2 | 11/2019 | Fritz et al. |

* cited by examiner

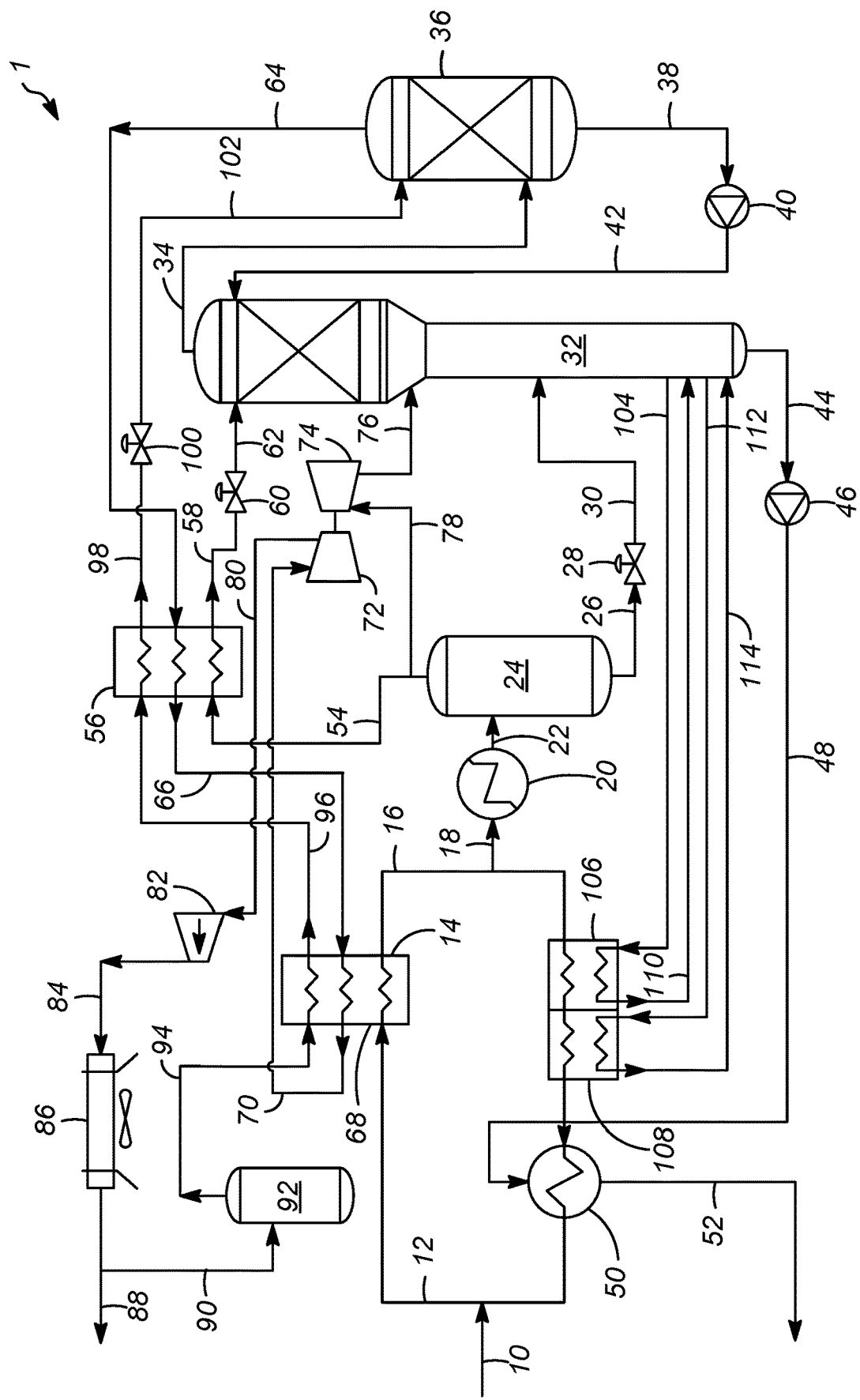

GAS SUBCOOLED PROCESS CONVERSION TO RECYCLE SPLIT VAPOR FOR RECOVERY OF ETHANE AND PROPANE

This application claims priority from provisional application 62/725,851, filed Aug. 31, 2018, incorporated herein in its entirety.

BACKGROUND OF THE INVENTION

The invention is related to a process for recovery of ethane and propane from natural gas. More specifically, the invention relates to a recycle split vapor process and system that may be converted from a gas subcooled process for improved performance and increased revenue for the customer.

Ethylene, ethane, propylene, propane and heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. The gas may also contain relatively lesser amounts of heavier hydrocarbons such as propane, butanes, pentanes and the like, as well as hydrogen, nitrogen, carbon dioxide and other gases.

The historically cyclic fluctuations in the prices of both natural gas and its natural gas liquid (NGL) constituents have reduced the incremental value of ethane and heavier components as liquid products. This has resulted in a demand for processes that can provide more efficient recoveries of these products. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane and heavier hydrocarbons content) of the gas, and the desired end products, each of these processes or a combination thereof may be employed. The cryogenic expansion process is now generally preferred for ethane recovery because it provides maximum simplicity with ease of startup, operating flexibility, good efficiency, safety, and good reliability. In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired C2+ components. Depending on the richness of the gas and the amount of liquid formed, the high-pressure liquids may be expanded to a lower pressure and fractionated. The vaporization occurring during expansion of the liquid results in further cooling of the stream. Under some conditions, pre-cooling the high-pressure liquid prior to the expansion may be desirable in order to further lower the temperature resulting from the expansion. The expanded stream, comprising a mixture of liquid and vapor, is fractionated in a distillation (demethanizer) column. In the column, the expansion cooled stream(s) is (are) distilled to separate residual methane, nitrogen, and other volatile gases as overhead vapor from the desired C2 components, C3 components, and heavier components as bottom liquid product.

If the feed gas is not totally condensed (typically it is not), the vapor remaining from the partial condensation can be split into two or more streams. One portion of the vapor is passed through a work expansion machine or engine, or an expansion valve, to a lower pressure at which additional liquids are condensed as a result of further cooling of the stream. The pressure after expansion is essentially the same as the pressure at which the distillation column is operated. The combined vapor-liquid phases resulting from the expansion are supplied as feed to the column.

The remaining portion of the vapor is cooled to substantial condensation by heat exchange with other process streams, e.g., the cold fractionation tower overhead. Depending on the amount of high-pressure liquid available, some or all of the high-pressure liquid may be combined with this vapor portion prior to cooling. The resulting cooled stream is then expanded through an appropriate expansion device, such as an expansion valve, to the pressure at which the demethanizer is operated. During expansion, a portion of the liquid will vaporize, resulting in cooling of the total stream. The flash expanded stream is then supplied as top feed to the demethanizer. Typically, the vapor portion of the expanded stream and the demethanizer overhead vapor combine in an upper separator section in the fractionation tower as residual methane product gas. Alternatively the cooled and expanded stream may be supplied to a separator to provide vapor and liquid streams. The vapor is combined with the tower overhead and the liquid is supplied to the column as a top column feed. In the ideal operation of such a separation process, the residue gas leaving the process will contain substantially all of the methane in the feed gas with essentially none of the heavier hydrocarbon components and the bottoms fraction leaving the demethanizer will contain substantially all of the heavier components with essentially no methane or more volatile components. In practice, however, this ideal situation is not obtained for the reason that the conventional demethanizer is operated largely as a stripping column. The methane product of the process, therefore, typically comprises vapors leaving the top fractionation stage of the column, together with vapors not subjected to any rectification step. Considerable losses of C2 components occur because the top liquid feed contains substantial quantities of C2 components and heavier components, resulting in corresponding equilibrium quantities of C2 components and heavier components in the vapors leaving the top fractionation stage of the demethanizer. The loss of these desirable components could be significantly reduced if the rising vapors could be brought into contact with a significant quantity of liquid (reflux), containing very little C2 components and heavier components; that is, reflux capable of absorbing the C, components and heavier components from the vapors. The present invention provides the means for achieving this objective and significantly improving the recovery of the desired products.

The present invention is generally concerned with the recovery of ethylene, ethane, propylene, propane and heavier hydrocarbons from such gas streams. A typical analysis of a gas stream to be processed in accordance with this invention would be, in approximate mole percent, 92.5% methane, 4.2% ethane and other $C_2$ components, 1.3% propane and other $C_3$ components, 0.4% isobutane, 0.3% normal butane, 0.5% pentanes plus, with the balance made up of nitrogen and carbon dioxide. Sulfur containing gases are also sometimes present.

The historically cyclic fluctuations in the prices of both natural gas and its natural gas liquid (NGL) constituents have reduced the incremental value of ethane and heavier components as liquid products. This has resulted in a demand for processes that can provide more efficient recoveries of these products. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane and heavier hydrocarbons content) of the gas, and the desired end products, each of these processes or a combination thereof may be employed.

The cryogenic expansion process is now generally preferred for ethane recovery because it provides maximum simplicity with ease of startup, operating flexibility, good efficiency, safety, and good reliability.

There are numerous facilities that employ the Gas Subcooled Process (GSP) developed by Ortloff Engineering in the 1970's. This design incorporates the addition of a reflux stream generated from a portion of the inlet gas which is fed as reflux to the top of a demethanizer column. The product recovery is dependent on the pressure, temperature and quality of the reflux stream at the top of the demethanizer column. The relative leanness is determined by the temperature of the cold separator so that the GSP processes rely on the cold temperature of the process. This GSP process has been used in many facilities to recover ethane or propane from natural gas streams. Existing GSP technology is limited in recovery to about 90-96% ethane recovery and 90-99% propane recovery. Retrofitting a GSP plant can increase recoveries to 97-99% ethane recovery and 97-99% propane recovery. However, there are significant costs involved in the additional equipment that are involved in prior art retrofitting designs.

An improved process was previously developed by Ortloff Engineering and is called the Recycle Split Vapor (RSV) Process. This process provides ultra-high ethane or propane recovery from natural gas streams. The RSV design incorporates the addition of a small reflux stream generated from residue (product) gas which is used to supplement the traditional reflux streams from the inlet gas stream. The residue reflux stream is fed into the demethanizer or deethanizer column to an additional rectification section that is installed above the typical top reflux feed point of the GSP process. The lower section of the tower provides bulk recovery of the desired liquid product while the top section provides a "polishing" step. RSV technology is extremely flexible and can operate as either an ethane recovery or a propane recovery process. This flexibility allows an operator to maximize plant profits based on ethane economics. In addition, an RSV plant can operate at flow rates significantly different than design. In the case of lower flow, higher recoveries can be achieved but for flow rates higher than design high product recoveries can be maintained. Current RSV units employ a single demethanizer tower. This technology modifies the GSP plant to an RSV-type design by adding cryogenic pumps and an additional fit-for-purpose tower for enhanced recovery. All other known technologies apply a single tower design which forces a complete redesign of the tower as opposed to an additional small and cost effective tower in accordance with the flow scheme of the present invention. The towers are referred to as fractionation towers as well as demethanizers or demethanizer towers herein. The invention allows for additional recovery due to efficiency of the RSV process. There is an increased performance and revenue for customer that is estimated at 9.7 MM$ per year based on a 200 MMSCFD FEED rate and 6.5 GPM.

BRIEF DESCRIPTION OF THE DRAWING

The FIGURE shows a flow scheme of the invention with two fractionation or demethanizer towers.

DETAILED DESCRIPTION OF THE INVENTION

The FIGURE illustrates a flow diagram of a process in accordance with the present invention. In the process, inlet gas enters at 120° F. and a pressure of 1040 psia as feed stream 10. Feed stream 10 proceeds into stream, 12. The stream, 12, is cooled to about 19° F. by heat exchange with a portion of a cool residue gas (stream 66 at about −17° F. in heat exchangers 14.

Following cooling, stream 16, passes into which is then cooled by heat exchanger 20 with cooled stream 22 entering separator 24 where the vapor (stream 54) is separated from the condensed liquid (stream 26).

The vapor stream 54 from separator 24 is divided into gaseous first and second streams, 54 and 78. Stream 54, containing about 30 percent of the total vapor, is sent through heat exchanger 56 with stream 58 after passing through valve 60 entering an upper portion of demethanizer column 32. A vapor stream 34 then exits the top of demethanizer column 32 to enter a lower portion of a second demethanizer column 36 that is smaller than demethanizer column 32. A liquid stream 38 exits a bottom section of second demethanizer column 36 to be compressed by compressor 40 with compressed stream 42 entering an upper portion of demethanizer column 32. A vapor stream 64, that comprises mostly methane exits a top portion of second demethanizer column 36 and is sent through heat exchanger 56 to a stream 68 and then to heat exchanger 14 to become stream 70 that is then compressed by expander compressors 72 and 74 and returns in stream 76 to demethanizer column 32. A liquid stream 44 exits the bottom of demethanizer column 32 in stream 44 that is then compressed by compressor 46 with stream 48 passing through heat exchanger 50 to then exit as natural gas liquid product stream 52 containing the higher hydrocarbons than the residue gas stream 88 that is mainly methane. Also shown are the streams and heat exchangers to heat and cool the streams as appropriate. Stream 70 passes through expander compressor 72 and then a compressed vapor stream 80 then passes through residue compressor 82 with stream 84 passing through heat exchanger 86 with residue gas 88 comprising methane. A portion of residue gas 88 is diverted in stream 90 to a residue filter coalescer 92 with stream 94 passing through heat exchanger 14 and then stream 95 passing through heat exchanger 56 to stream 98 and valve 100 and then in stream 102 to second demethanizer unit 36. A portion of stream 16 passes through heat exchanger 106 to heat exchanger 50 and then is combined with stream 12. A mostly vapor stream 104 exits demethanizer column 32 and passes through line 104 to heat exchanger 106 to return to demethanizer column 32 in stream 110.

The present invention provides a significant improvement in recovery of C2 and C3 hydrocarbons when compared to the plant before the addition of the second smaller demethanizer unit as shown in the following table:

TABLE

|  | GSP Recover | RSV Recovery |
|---|---|---|
| C2 Recovery % | 87.02 | 99.98 |
| C3 Recovery % | 99.46 | 100 |
| Chiller Temperature (° F.) | −29.3 | −28 |
| Refrigeration BHP | 4450 | 3320 |
| Residue BHP | 13433 | 13395 |
| Compression HP | 17883 | 16715 |

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for the separation of a gas stream containing methane, C2 components, C3 components, and heavier hydrocarbon components into a volatile residue gas fraction and a relatively less volatile fraction containing the C2 components, C3 components and heavier hydrocarbon components or the C3 components and heavier hydrocarbon components in a fractionation tower, comprising the steps of dividing the gas stream into a gaseous first stream and a gaseous second stream, cooling the gaseous second stream under pressure sufficiently to partially condense, separating the partially condensed second stream to thereby provide a vapor stream and a condensed stream, expanding the vapor stream to a lower pressure and supplying it at a first mid-column feed position within a lower region of the fractionation tower, expanding at least a portion of the condensed stream to the lower pressure and supplying it to the fractionation tower at a second mid-column feed position, withdrawing a distillation stream from an upper region of the fractionation tower and, sending the distillation stream to a lower region of a second fractionation tower that is smaller than the first fractionation tower, removing a more volatile stream from the second fractionation tower to be sent to a residue gas stream; removing a less volatile stream from the second fractionation tower and sending at least a portion of the less volatile stream to the first fractionation tower. An embodiment of the invention is one, any or all of prior embodiments in this paragraph up through the first embodiment in this paragraph wherein the second fractionation tower is about 10 to 50% of the height of the fractionation tower. An embodiment of the invention is one, any or all of prior embodiments in this paragraph up through the first embodiment in this paragraph wherein the second fractionation tower is about 20 to 40% of the height of the fractionation tower. An embodiment of the invention is one, any or all of prior embodiments in this paragraph up through the first embodiment in this paragraph wherein the relatively less volatile fraction includes about 99.5 to 100 wt % of C2 components from the gas. An embodiment of the invention is one, any or all of prior embodiments in this paragraph up through the first embodiment in this paragraph wherein the relatively less volatile fraction includes about 99.98 wt % of C2 components from the gas. An embodiment of the invention is one, any or all of prior embodiments in this paragraph up through the first embodiment in this paragraph wherein the relatively less volatile fraction includes about 98 to 100 wt % of C3 components from the gas. An embodiment of the invention is one, any or all of prior embodiments in this paragraph up through the first embodiment in this paragraph wherein the relatively less volatile fraction includes about 100 wt % of C3 components from the gas. An embodiment of the invention is one, any or all of prior embodiments in this paragraph up through the first embodiment in this paragraph wherein the natural gas liquid is at about 1000 psig. An embodiment of the invention is one, any or all of prior embodiments in this paragraph up through the first embodiment in this paragraph wherein the natural gas liquid comprises a maximum of 5,000 ppmv C1. An embodiment of the invention is one, any or all of prior embodiments in this paragraph up through the first embodiment in this paragraph, further comprising at least one of sensing at least one parameter of the process and generating a signal from the sensing; sensing at least one parameter of the process and generating data from the sensing; generating and transmitting a signal; generating and transmitting data.

The invention claimed is:

1. A process for the separation of a gas stream containing methane, C2 components, C3 components, and heavier hydrocarbon components into a volatile residue gas fraction and a relatively less volatile fraction containing said C2 components, C3 components and heavier hydrocarbon components or said C3 components and heavier hydrocarbon components in a fractionation tower; comprising the steps of:

dividing said gas stream into a gaseous first stream and a gaseous second stream;

cooling said gaseous second stream under pressure sufficiently to partially condense;

separating said partially condensed second stream in a separator to provide a vapor stream and a condensed stream;

expanding said vapor stream to a lower pressure than within the separator and supplying it at a first mid-column feed position within a lower region of a first fractionation tower comprising an upper region and said lower region, wherein said lower region is vertically below a middle of said first fractionation tower and said upper region is vertically above the middle of said first fractionation tower, expanding at least a portion of the condensed stream to said lower pressure and supplying it to said first fractionation tower at a second mid-column feed position;

withdrawing a distillation stream from said upper region of the first fractionation tower;

sending said distillation stream to a lower region of a second fractionation tower that is smaller than said first fractionation tower, said second fractionation tower comprising an upper region and said lower region wherein said lower region is vertically below a middle of said second fractionation tower and said upper region is vertically above the middle of said second fractionation tower;

removing a more volatile stream from said second fractionation tower to be sent to a residue gas stream; and removing a relatively less volatile fraction from said second fractionation tower and sending at least a portion of said relatively less volatile fraction to said first fractionation tower.

2. The process of claim 1 wherein said second fractionation tower is about 10 to 50% of the height of said first fractionation tower.

3. The process of claim 1 wherein said second fractionation tower is about 20 to 40% of the height of said first fractionation tower.

4. The process of claim 1 wherein said relatively less volatile fraction includes about 99.5 to 100 wt % of C2 components from said gas stream.

5. The process of claim 1 wherein said relatively less volatile fraction includes about 99.98 wt % of C2 components from said gas stream.

6. The process of claim 1 wherein said relatively less volatile fraction includes about 98 to 100 wt % of C3 components from said gas stream.

7. The process of claim 1 wherein said relatively less volatile fraction includes about 100 wt % of C3 components from said gas stream.

8. The process of claim 1, further comprising at least one of:
sensing at least one parameter of the process and generating a signal from the sensing;
sensing at least one parameter of the process and generating data from the sensing;
generating and transmitting a signal; and
generating and transmitting data.

9. The process of claim 1, further comprising withdrawing a natural gas liquid stream from a bottom of said first fractionation tower.

10. The process of claim 9 wherein said natural gas liquid is at about 1000 psig.

11. The process of claim 9 wherein said natural gas liquid comprises a maximum of 5,000 ppmv C1 components.

* * * * *